(12) United States Patent
Miyawaki

(10) Patent No.: US 6,229,592 B1
(45) Date of Patent: May 8, 2001

(54) NEGATIVE FILM WITH IDENTIFICATION NUMBER, AND PHOTOGRAPHIC PRINTING APPARATUS

(75) Inventor: Hiroshi Miyawaki, Wakayama (JP)

(73) Assignee: Noritsu Koki Co., LTD, Wakayama-Ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/113,050

(22) Filed: Jul. 9, 1998

(30) Foreign Application Priority Data

Jul. 11, 1997 (JP) ........................................... 9-186562

(51) Int. Cl.⁷ ..................... G03B 27/52; G03B 27/32; H04N 1/04
(52) U.S. Cl. ........................ 355/40; 355/27; 358/487
(58) Field of Search .................. 355/40, 39, 35, 355/46, 77; 358/487, 506, 514, 474; 395/109; 396/319, 311

(56) References Cited

U.S. PATENT DOCUMENTS

| | | | |
|---|---|---|---|
| 5,264,683 | | 11/1993 | Yoshikawa . |
| 5,309,199 | * | 5/1994 | Frick ........................................ 355/77 |
| 5,493,354 | * | 2/1996 | Watanabe et al. ...................... 355/41 |
| 5,703,701 | * | 12/1997 | Yamamoto et al. .................. 358/487 |
| 5,739,924 | * | 4/1998 | Sano ..................................... 358/487 |
| 5,751,505 | * | 5/1998 | Yoshida ................................ 396/319 |
| 5,767,945 | * | 6/1998 | Fields et al. .......................... 355/39 |
| 5,831,714 | * | 11/1998 | Yoshikawa ............................ 355/40 |
| 5,936,709 | * | 8/1999 | Yamamoto ............................ 355/40 |
| 5,966,505 | * | 10/1999 | Igarashi et al. ....................... 395/109 |

FOREIGN PATENT DOCUMENTS

| | | |
|---|---|---|
| 0622679 | 11/1994 | (EP) . |
| 2754073 | 4/1998 | (FR) . |

* cited by examiner

*Primary Examiner*—Russell Adams
*Assistant Examiner*—Peter B. Kim
(74) *Attorney, Agent, or Firm*—Fulbright & Jaworski, LLP

(57) ABSTRACT

A negative film with an identification number printed directly on a film surface of a non-frame image area other than frame image areas with photographic images formed therein. A photographic printing apparatus for printing a negative film having frame image areas and non-frame image areas other than the frame image areas includes: a first identification number reader for reading an identification number printed in a fogged portion formed in the one of the non-frame image areas in a leading end region of the negative film; a second identification number reader for reading an identification number printed between perforations formed in the non-frame image areas of the negative film; and a printer for printing the identification number read on a back of printing paper having, printed thereon, frame images of the negative film with the identification number.

2 Claims, 6 Drawing Sheets

NEGATIVE FILM WITH IDENTIFICATION NUMBER, AND PHOTOGRAPHIC PRINTING APPARATUS

BACKGROUND OF THE INVENTION

1. Field of the Invention

This invention relates to a negative film with an identification number affixed thereto for distinguishing it from other negative films, and a photographic printing apparatus for making photographic prints from such a negative film.

2. Description of the Related Art

Generally, a negative film (one negative film being hereinafter called a strip negative also) used in taking pictures with a camera is brought to a photo processing agent for simultaneous printing. At a developing laboratory, a plurality of strip negatives usually are joined with splicing tape to form an elongate negative film prior to a developing process. Subsequently, image frames rendered visible on the negative film are printed on printing paper. The negative film is cut into piece negatives each having four or six frames. The piece negatives are placed in negative sheet holders, and are collated with prints cut frame by frame from the developed printing paper. The prints and piece negatives are handed over through the photo processing agent to the customer. When ordering additional prints of frame images formed on the piece negatives, the customer, at the processing agent's, writes a desired number of prints to be made of each selected image frame on an order slip, and gives the negative sheet holders containing the piece negatives. At the developing laboratory having received such an order from the agent, the frame images must be printed on printing paper by using the piece negatives. At the laboratory, it is necessary to apply identification numbers to the negative films, which may be strip negatives or piece negatives, to distinguish the negative films from other films. These identification numbers are used in collating the negatives with prints made afterward.

Conventionally, a check tape having, printed thereon, an identification number expressed by characters, numerals and/or signs is pasted to a leading end of each negative film. In a collating operation, the operator refers to this identification number to determine whether the negative film corresponds to printing paper, i.e. prints. Japanese Patent Laying-Open Publication H4-123056 discloses a technique in which a magnetic store is formed on a check film instead of an identification number printed on the check tape, the check tape is pasted to a leading end of a negative film, and information on the negative film is written into the magnetic store on the check film. Further, Japanese Patent Laying-Open Publication H9-22073 discloses a technique in which an identification number in the form of a bar code is recorded as a latent image between perforations in each negative film at a film factory, the latent image becoming readable upon development.

Where a check sheet having an identification number in some form or other recorded thereon is pasted to a negative film, a check sheet pasting operation is itself troublesome. Moreover, since the check sheet has a larger area than what is occupied by the identification number, only a limited position is allowed for its application, particularly on a piece negative. Where an identification number is recorded as a latent image on a negative film at a film factory, a different identification number cannot be given to the negative film at a developing laboratory.

SUMMARY OF THE INVENTION

An object of this invention is to provide a negative film with an identification number, which does not require a troublesome pasting operation and which allows a separate identification number to be given at a developing laboratory, and a photographic printing apparatus for processing such a negative film with an identification number.

The above object is fulfilled, according to this invention, by a negative film with an identification number printed directly on a film surface of a non-frame image area other than frame image areas with photographic images formed therein. That is, the identification number is printed directly on the film surface of the non-frame image area of the negative film having both the frame image areas with photographic images formed therein and the non-frame image area other than the frame image areas. This dispenses with an operation to apply a sheet having the identification number recorded thereon to the negative film, and minimizes an area occupied by the identification number. Only by inputting print data to a printing device, the identification number may be printed in the form of characters, numerals and/or signs selected at a developing laboratory.

A thermal printer may be cited as a preferred printing device. In that case, white ink may be used to secure a sufficient difference in density between a printed portion and other portions, whether the negative film on which the identification number is printed is undeveloped or developed, or wherever on the film surface the identification number is printed. Thus, the identification number may be recognized with ease both visually and optically.

The negative film may be an elongate strip negative (usually having one full film length) having a fogged portion formed in a non-frame image area in a leading end region thereof. Then, in a preferred embodiment of this invention, the identification number is printed in the fogged portion formed in the leading end region. The leading end region of the strip negative is used for winding the film on the spool of a camera. Thus, the fogged portion formed in the leading end region has a certain length. This fogged portion may be used to print a bar code and numerals which will not be obstructive to an image printing operation.

The negative film may be a piece negative cut from an elongate film (usually having one full film length) and having several frames. Then, in a preferred embodiment of this invention, the identification number is printed between perforations formed in the piece negative. Generally, a piece negative, unlike a strip negative, has no fogged portion in a leading end region thereof, and therefore provides limited locations for printing the identification number. Thus, positions between the perforations formed along an edge of the film are adopted as locations for printing the identification number. In order that, despite the narrow locations, the printing device may print the identification number reliably, and that a reading device may read the printed identification number reliably, a preferred embodiment of this invention uses a region between each adjacent pair of perforations for writing one bit of the identification number written in bits, Where six positions between the perforations are allocated for writing the bits, the identification number may be provided in six bits. In this case, positions with prints between the perforations are regarded as "1", and those with no prints as "0". The positions between the perforations have sufficiently large areas for printing simple solid prints. Thus, the identification number may be printed and read reliably.

A photographic printing apparatus in one embodiment of this invention, which uses a negative film with an identification number as noted above, comprises an identification number reader for reading the identification number from the negative film, and a printer for printing the identification number read by the identification number reader, on a back of printing paper having, printed thereon, frame images of the negative film with the identification number. In this construction, the identification number is used inside the photographic printing apparatus in time of a printing process for linking the negative film with order information such as numbers of prints and print sizes. Moreover, the identification number is used in a collation between finished photo prints and the negative film.

A photographic printing apparatus for automatically processing both strip negatives and piece negatives may comprise a first identification number reader for reading an identification number printed on each strip negative, and a second identification number reader for reading an identification number printed on each piece negative. This enable a reliable collation between film and prints not only for simultaneous prints but for additional prints made from piece negatives.

Other features and advantages of this invention will be apparent from the following description of the embodiment to be taken with reference to the drawings.

DESCRIPTION OF THE PREFERRED EMBODIMENT

Figure 1:
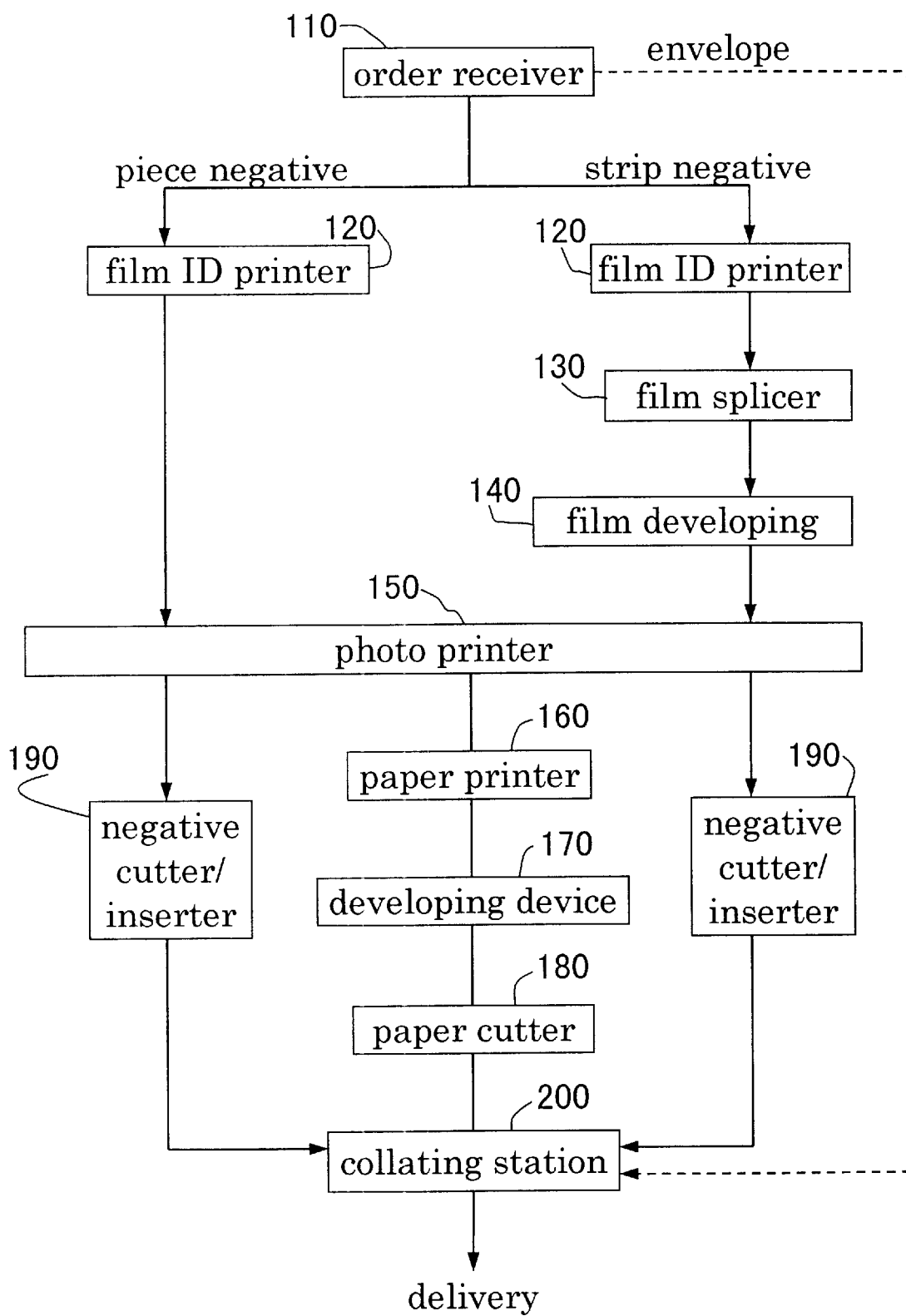
FIG. 1 is an explanatory view of a photo processing system employing a film with an identification number according to this invention.

FIG. 1 schematically shows a photographic film processing system at a photo developing laboratory, which employs a film with an identification number according to this invention. The developing laboratory may receive undeveloped negative films 1, i.e. strip negatives 1A each in one full length, brought in for simultaneous printing, or developed negative films 1, i.e. piece negatives 1B cut into units of several frames from strip negatives 1A, brought in for additional prints.

When the strip negatives 1A are brought to an order receiving machine 110, the strip negatives 1A are taken out of product envelopes 2 and inputted to the order receiving machine 110 as linked with identification numbers and order information such as numbers of prints and print sizes applied to the product envelopes 2. The strip negatives 1A taken out are transmitted to a film identification number printer 120 for printing, in a predetermined location, the same identification numbers as applied to the envelopes 2 or new identification numbers related thereto by a method to be described in detail hereinafter. The strip negatives 1A are thereafter transmitted to a film splicer 130 for successively joining the negatives with splicing tape. As a result, a roll of elongate negative film 1 is formed which includes approximately 100 strip negatives 1A joined together. When loaded into a film developing unit 140, the roll of elongate negative film 1 is automatically transported through processing tanks such as a developing tank, a fixing tank and a rinsing tank, and is thereafter dried, to have images rendered visible. The negative film 1 with the visible images is taken up in a roll, and forwarded to a photographic printing apparatus 150. In the photographic printing apparatus 150, the frames on the negative film 1 are successively set to an exposing position, and printed with predetermined exposure and in predetermined numbers on printing paper 3. The printing paper 3 with the frame images printed thereon is transmitted to a paper printer 160 where the same identification numbers as printed on the corresponding strip negatives 1A are printed on the back of printing paper 3. Subsequently, the printing paper 3 is developed at a paper developing device 170, and cut frame by frame by a paper cutter 180 to become finished photo prints which are then forwarded to a collating station 200.

The strip negatives IA having undergone the printing process are transmitted to a negative cutter/inserter 190. The strip negatives 1A are cut into piece negatives 1B each having a predetermined number of frames (e.g. four or six frames). The piece negatives 1B are successively inserted into negative sheets, and forwarded to the collating station 200 for collation with the photo prints.

At the collating station 200, the operator checks correspondence between the frame images on the piece negatives 1B and photo prints, and finished states thereof. When the results are satisfactory, the negative sheets and photo prints are put into the product envelopes 2 received from the customer. In the event of defective printing, prints are made all over again, collated at the collating station 200, and put into the envelopes 2.

When product envelopes 2 containing developed piece negatives are brought to the order receiving machine 110 as an order for additional prints, the piece negatives 1B are taken out of the envelopes 2, and inputted to the order receiving machine 110 as linked with identification numbers and order information such as numbers of prints and print sizes applied to the product envelopes 2. The piece negatives 1B taken out are transmitted to the film identification number printer 120 for printing identification numbers in a predetermined location as described in detail hereinafter. The piece negatives 1B with the identification numbers printed thereon are forwarded one by one to the photographic printing apparatus 150. In the photographic printing apparatus 150, selected frames on the piece negatives 1B are set to the exposing position, and printed with predetermined exposure and in predetermined numbers on printing paper 3. The printing paper 3 with the frame images printed thereon is transmitted to the paper printer 160 where the same identification numbers as printed on the corresponding piece negatives 1B are printed on the back of printing paper 3. Subsequently the printing paper 3 is developed at the paper developing device 170, and cut frame by frame by the paper cutter 180 to become finished photo prints which are then forwarded to the collating station 200. The piece negatives 1B having undergone the printing process are inserted into negative sheets by the negative cutter/inserter 190, and forwarded to the collating station 200 for collation with the photo prints.

Figure 2:
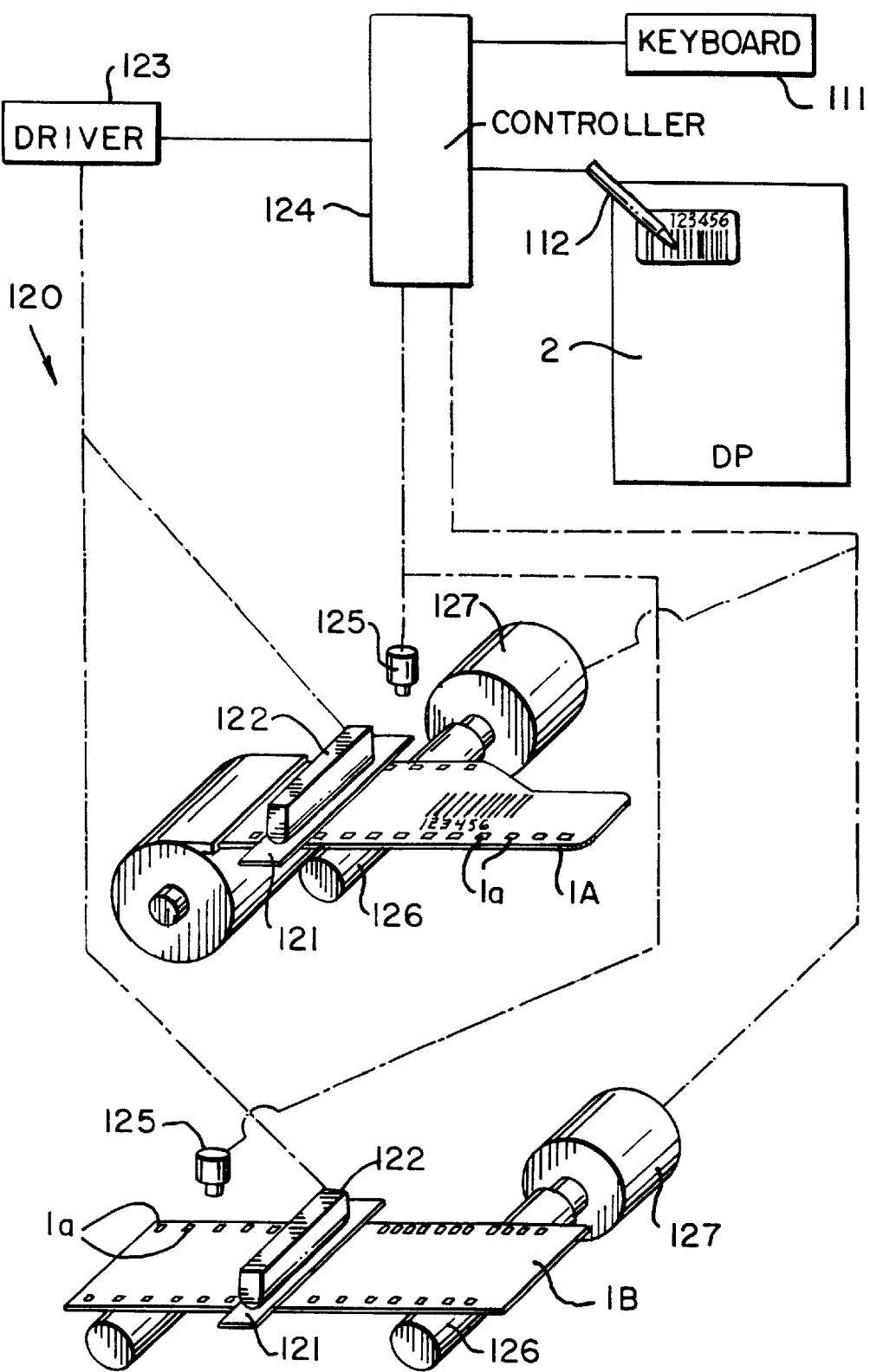
FIG. 2 is a schematic view of an identification number printing device.

The construction of film identification number printer 120 will be described with reference to FIG. 2. This printer 120 is a thermal printer which uses a white ribbon 121. The printer 120 includes a thermal head 122, and a controller 124 for controlling the thermal head 122 through a driver 123.

The order receiving machine 110 has a keyboard 111 and a bar-code reader 112 connected to the controller 124. The bar-code reader 112 reads bar codes representing identification numbers from ID code seals applied to product envelopes 2. The identification numbers read are stored in a memory of controller 124. Where product envelopes 2 have no bar codes applied thereto but have numerals or the like recorded thereon, the operator may input identification numbers directly through the keyboard 111 to be stored in the memory of controller 124.

Further, the controller 124 has, connected thereto, an optical sensor 125 for detecting perforations 1a formed in strip negatives 1A and piece negatives 1B. A motor 127 for driving a transport roller 126 to transport the negatives is also connected to the controller 124 through a driver not shown. The motor 127 has an encoder mounted on a rotary shaft thereof for detecting rotation of motor 127. The encoder transmits an output signal to the controller 124. Based on this signal, the controller 124 controls the motor 127 to rotate at a fixed rate, to transport negative films 1 at a fixed rate.

This printer 120 prints identification numbers in different positions, depending on whether the films 1 are strip negatives 1A or piece negatives 1B. In any case, each film 1 includes frame image areas 1x for forming photographic images, and non-frame image areas 1z other than the frame image areas 1x. The non-frame image areas 1z are where identification numbers are printed.

Figure 3:
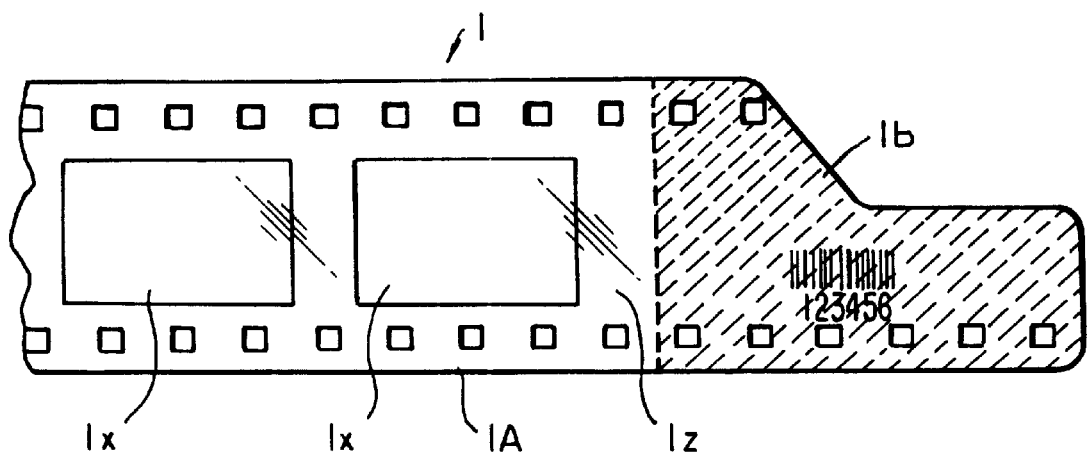
FIG. 3 is an explanatory view of an identification number printed on a strip negative.
Figure 4:
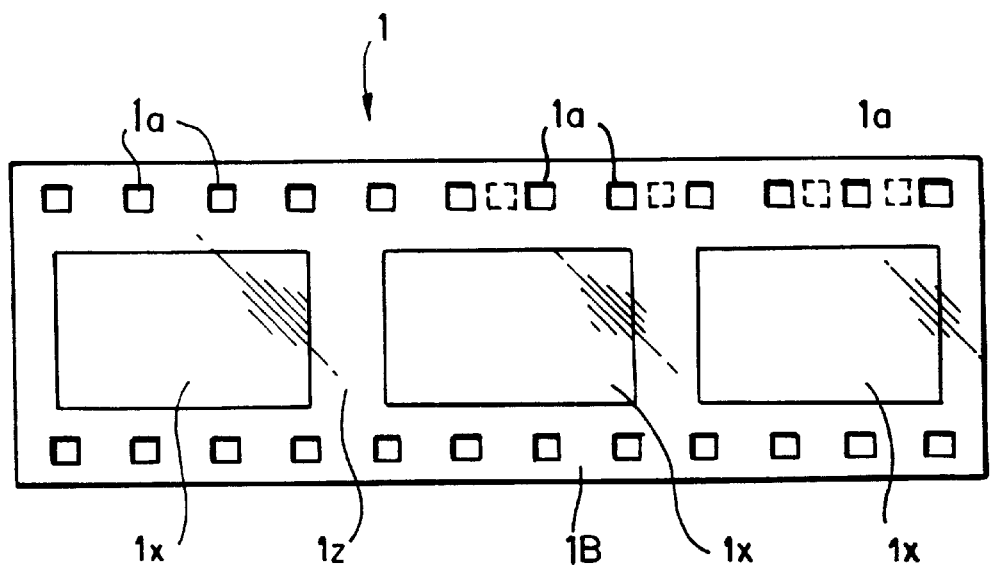
FIG. 4 is an explanatory view of an identification number printed on a piece negative.

As shown in FIG. 3, each strip negative 1A has a fogged area formed on a leader region thereof, for printing a bar code representing an identification number in 6 to 10 digits, and numerals under the bar code for confirmation by the operator. As shown in FIG. 4, each piece negative 1B has square white marks printed as a bit code in 6 digits, with each digit allocated to a position between adjacent perforations 1a. Since this is information in six bits, the 6th power of 2, i.e. 64, identification numbers are possible. Of course, the digits may be increased, as necessary, to 8 digits, for example, which provide 256 different identification numbers. Further, it is possible to use positions between both the upper and lower perforations 1a. This piece negative 1B also includes numerals printed adjacent the leading perforation 1a for confirmation by the operator.

The photographic printing apparatus will be described next with reference to FIGS. 5 through 7. This apparatus processes negative films 1 with identification numbers according to this invention.

Figure 5:
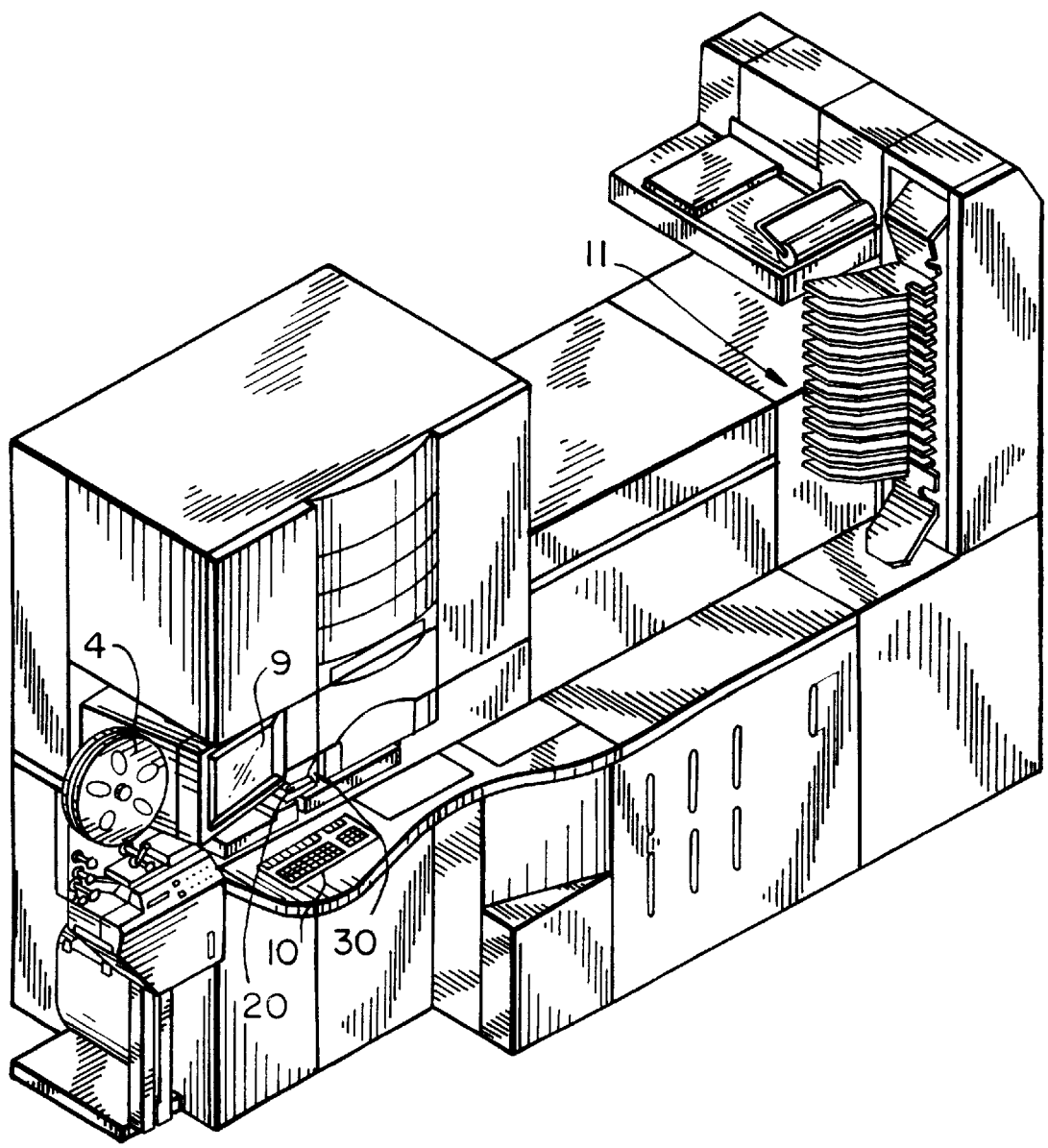
FIG. 5 a perspective view of a photographic printing apparatus for processing the negative with an identification number according to this invention.

FIG. 5 shows the entire photographic printing apparatus containing an image information reader 20 and an exposing and printing device 30 to be described later. The image information reader 20 reads image information from developed negative films 1 rolled on a reel 4, and presents the information on a display 9. The operator observes the information displayed, and operates a control panel 10. Then, the exposing and printing device 30 exposes printing paper with proper exposure. Subsequently, finished prints having undergone developing and other processes are discharged into a print storage 11.

Figure 6:
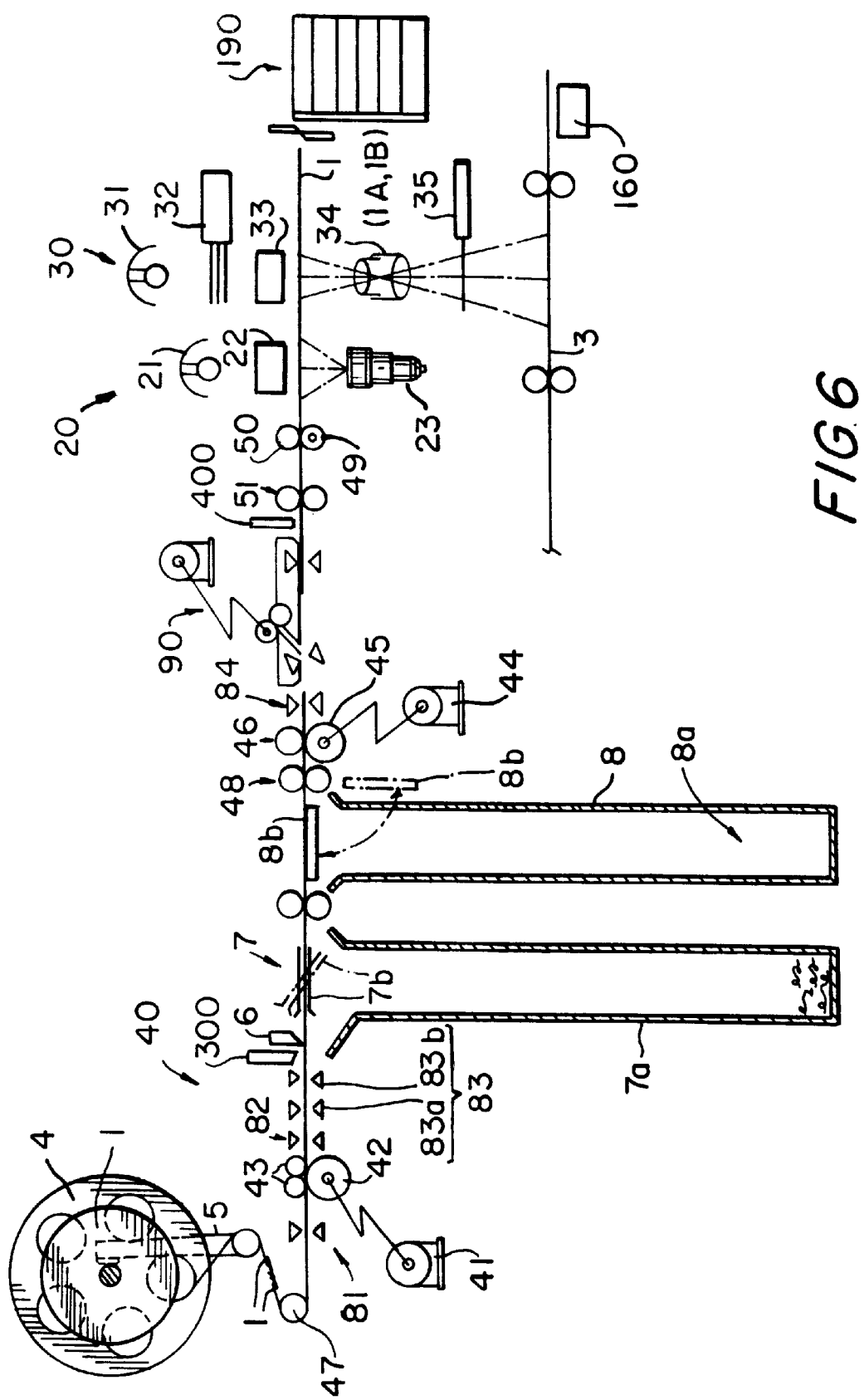
FIG. 6 is a schematic view showing the construction of the apparatus shown in FIG. 5.
Figure 7:
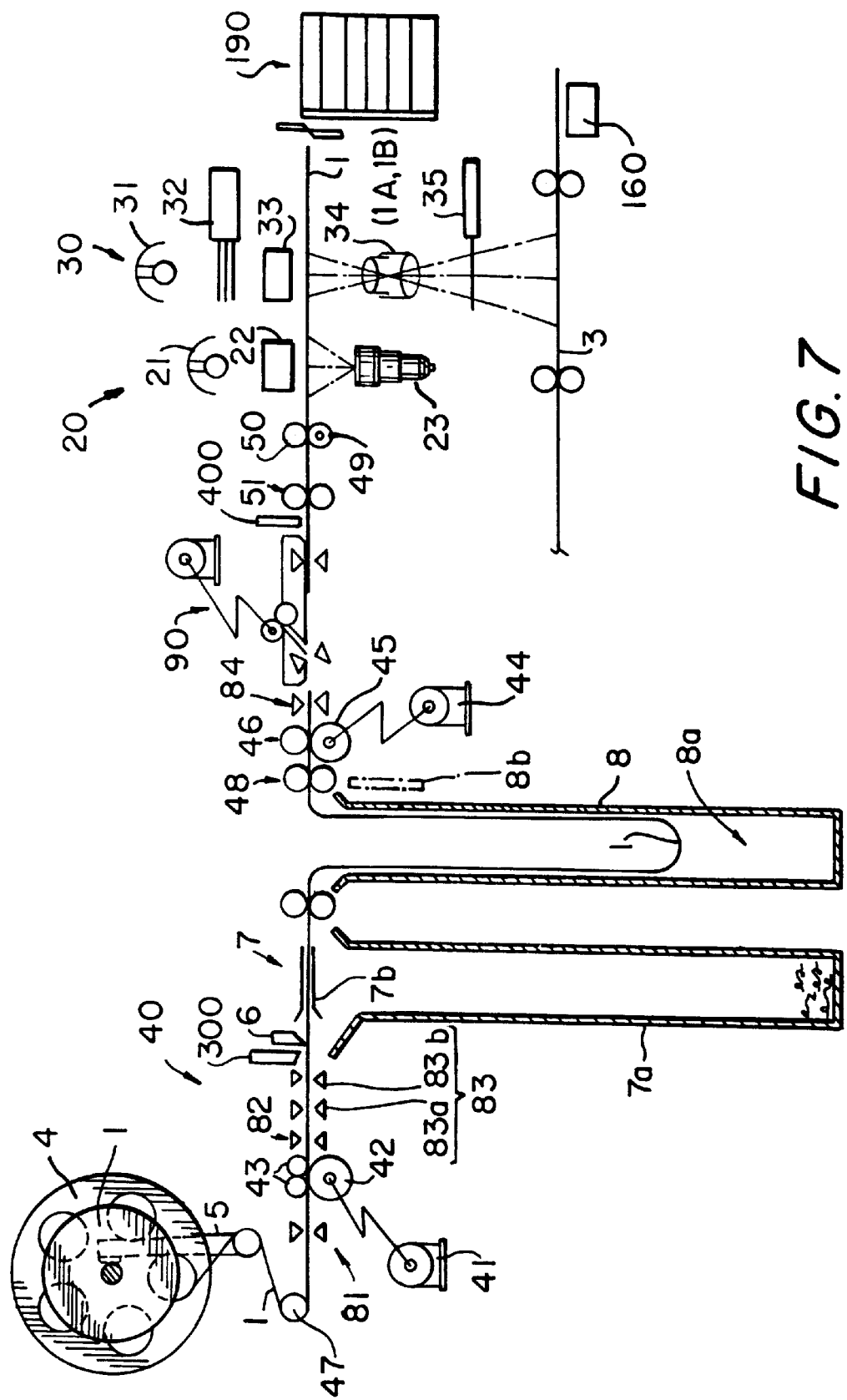
FIG. 7 is a schematic view showing a different operating mode.

As shown in FIGS. 6 and 7, developed elongate negative film 1 is rolled on the reel 4. The elongate negative film 1 may be cut into units of orders to become strip negatives 1A again prior to an exposing and printing process as necessary. A dancer 5 is disposed adjacent a support axis of the reel 4 for tightening the negative film 1, A film transporting device 40 is provided to transport the negative film 1 from the reel 4 toward the image information reader 20 and exposing and printing device 30 which is one example of exposure processing device.

The film transporting device 40 includes a first transport unit and a second transport unit. The first transport unit includes a pulse motor 41 for rotating a first drive roller 42, two idle rollers 43 for contacting the first drive roller 42, a DC motor 44 for rotating a second drive roller 45, an idle roller 46 for contacting the second drive roller 45, an idle roller 47 for changing directions, and a pair of idle rollers 48 in contact with each other. The negative film 1 is thereby transported toward the image information reader 20. A film cutter 6 is disposed on the transport path of the first transport unit for cutting the elongate film 1 into strip negatives 1A corresponding to units of orders.

The second transport unit of the transporting device 40 transports the strip negatives 1A and piece negatives 1B introduced to a halfway position, if any, to the image information reader 20. The second transport unit includes a third drive roller 49, an idle roller 50 and a pair of idle rollers 51.

A group of sensors is arranged on the transport path of transporting device 40. For example, a film sensor 81 is disposed upstream with respect to a transport direction of the first drive roller 42 for detecting presence of negative film 1. An end sensor 82 is disposed downstream of the first drive roller 42 for detecting joint regions of strip negatives 1A joined by splicing tape. Each of these sensors 81 and 82 includes a light emitter and a light receiver.

An image frame discriminating device 83 is disposed downstream of the end sensor 82 and upstream of the film cutter 6 for determining whether the strip negatives 1A are suitable for processing by the exposing and printing device 30. The image frame discriminating device 83 includes two image frame sensors 83a and 83b each having a light emitter and a light receiver. The image frame discriminating device 83 detects frames having photographic images and determines lengths of the frames from amounts of light transmitted through the strip negatives 1A. Specifically, image frame intervals in each order are measured and widths of the image frames are measured based on frame edge detection signals. In this way, the image frame discriminating device 83 determines whether each image frame is full size, panorama size or half size.

A first identification number reader 300 is disposed immediately upstream with respect to the transport direction of the film cutter 6 for reading an identification number in the form of a bar code printed in a leading end region of each strip negative 1A. The identification number read is transmitted to a controller not shown, for use in identifying the strip negative 1A in each subsequent photographic process. A discharge mechanism 7 is disposed downstream of the film cutter 6 for removing unwanted parts of the films from the transport path.

The discharge mechanism 7 includes a refuse bin 7a disposed below the transport path, a pivotable guide 7b disposed in an opening of refuse bin 7a and defining a slit for passing the films, and a solenoid, not shown, for driving the guide 7b. In the state shown in solid lines in FIG. 6, the films pass through the slit. In the state shown in phantom lines, unwanted parts of the films are guided to fall into the refuse bin 7a.

A loop tank 8 is disposed downstream of the discharge mechanism 7, which defines a loop accommodating space 8a for receiving the strip negatives 1A in loop form. A loop guide 8b is disposed in an opening of loop tank 8, which is opened and closed by a DC motor not shown. FIG. 6 shows no strip negatives 1A drooping in loop form. FIG. 7 shows strip negatives 1A drooping in loop form.

A leading end sensor 84 is disposed downstream of the loop tank 8 and downstream of the second drive roller 45. The leading end sensor 84 includes a light emitter and a light receiver for detecting the leading end of each strip negative 1 Further downstream of the leading end sensor 84 is a transport path branching device 90 acting as a process averting device for removing strip negatives 1A determined by the image frame discriminating device 83 to be unsuitable, from the processes by the image information reader 20 and exposing and printing device 30.

A cover not shown is disposed upstream of the transport path branching device 90. By removing this cover, piece negatives 1B may be introduced into the transport path. Consequently, a second identification number reader 400 is disposed downstream of the transport path branching device 90 for detecting square digit. marks representing an identification number and printed between perforation 1a in each piece negative 1B. The identification number read is transmitted to the controller not shown, for use in identifying the piece negative 1B in each subsequent photographic process.

Further away downstream from the transport path branching device 90 are the image information reader 20 and exposing and printing device 30 arranged in the stated order. The image information reader 20 and exposing and printing device 30 both have known constructions. The image information reader 20 includes a lamp 21, a mirror tunnel 22 and an image pickup 23. The printing and exposing device 30 includes an exposing lamp 31, a light adjusting filter 32, a mirror tunnel 33, optics 34 and a shutter 35, for enlarging and printing images of negative film 1 on printing paper 3. The negative cutter/inserter 190 is disposed in a terminal end region of the second transport unit for cutting the strip negatives 1A into piece negatives 1B and inserting the latter into negative sheets, or inserting piece negatives 1B introduced in the halfway position back into the negative sheets.

The paper printer 160 is disposed on a printing paper transport line for printing the identification number given to the negative film 1 having the images corresponding to printed images, on the back of printing paper 3 having undergone a printing process. The paper printer 160 is connected to the controller noted hereinbefore, to be controlled by the controller to print the identification numbers read by the first identification number reader 300 or second identification number reader 400. Generally, a dot impact printer. is used as the paper printer 160. A different type of printer such as a thermal printer may be used as long as a satisfactory developer resistance is secured.

In the foregoing description of the embodiment, a thermal printer using a white ribbon is proposed as the film identification number printer 120. A different color ribbon may of course be used if readable by the first and second identification number readers 300 and 400. A printer different from a thermal printer may be used. The important aspect of this invention lies in printing identification numbers directly on negative films 1.

What is claimed:

1. A film processing system for printing a photographed image onto printing paper using a photographic film having frame image areas with photographic images formed therein, and non-frame image areas other than the frame image areas, said system comprising:

an order receiving machine for receiving order information for the photographic film brought in from a customer, said order information received as linked with an identification number for the photographic film;

a first printer for printing said identification number sent from said order receiving machine directly onto one of said non-frame image areas using an ink, wherein said first printer prints a mark indicating '0' or '1' onto a region between adjacent perforations in said photographic film so that said region acts as a region for indicating one digit of a binary notation for a code having a plurality of bits making said identification number;

an identification number reader for reading said identification number from the photographic film;

a photographic printing apparatus for printing onto said printing paper photographic images in the photographic film according to said order information linked with said read identification number; and a second printer for printing said identification number linked with said order information on a back of said printing paper printed according to said order information.

2. A film processing system as defined in claim 1, wherein said first printer prints said identification number on a fogged portion formed in a leading region of said photographic film.

* * * * *

UNITED STATES PATENT AND TRADEMARK OFFICE
CERTIFICATE OF CORRECTION

PATENT NO.      : 6,229,592 B1
DATED           : May 8, 2001
INVENTOR(S)     : Miyawaki et al.

It is certified that error appears in the above-identified patent and that said Letters Patent is hereby corrected as shown below:

Title page,
U.S. PATENT DOCUMENTS, change "5/1998" to -- 10/1999 --.

Column 5,
Line 7, change "1" to -- 1A --.

Column 7,
Line 18, after "digits" delete period.

Signed and Sealed this

Twelfth Day of March, 2002

Attest:

JAMES E. ROGAN
*Attesting Officer*     *Director of the United States Patent and Trademark Office*